(12) United States Patent
Kobayashi

(10) Patent No.: US 6,535,691 B1
(45) Date of Patent: Mar. 18, 2003

(54) LENS DRIVE AND LENS SHUTTER UNIT

(75) Inventor: Kouichi Kobayashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 7 days.

(21) Appl. No.: 09/624,889

(22) Filed: Jul. 24, 2000

(51) Int. Cl.[7] .............................. G03B 3/10; G03B 13/34
(52) U.S. Cl. ........................................................ 396/136
(58) Field of Search .............................. 396/133, 135, 396/136

(56) References Cited

U.S. PATENT DOCUMENTS

| | | | | |
|---|---|---|---|---|
| 5,057,859 A | * | 10/1991 | Ishimaru | 396/49 |
| 5,111,230 A | * | 5/1992 | Kobayashi | 396/133 |
| 5,446,517 A | * | 8/1995 | Murakami et al. | 396/133 |
| 5,754,895 A | * | 5/1998 | Nishino | 396/79 |
| 5,887,201 A | * | 3/1999 | Maeno | 396/86 |
| 6,029,010 A | * | 2/2000 | Miyanari | 396/90 |

FOREIGN PATENT DOCUMENTS

| | | |
|---|---|---|
| JP | 6-258564 | 9/1994 |
| JP | 8-015592 | 1/1996 |
| JP | 8-106038 | 4/1996 |

* cited by examiner

Primary Examiner—David M. Gray
Assistant Examiner—Rochelle Blackman
(74) Attorney, Agent, or Firm—McGinn & Gibb, PLLC

(57) ABSTRACT

A lens drive includes a stepper motor that can be rotated forward and reversely; a motor control for controlling the driving of the stepper motor, a photographing lens for forming a subject image on a predetermined image surface, a lens driver for driving the photographing lens, and a coupler for coupling the stepper motor and the lens driver.

17 Claims, 8 Drawing Sheets

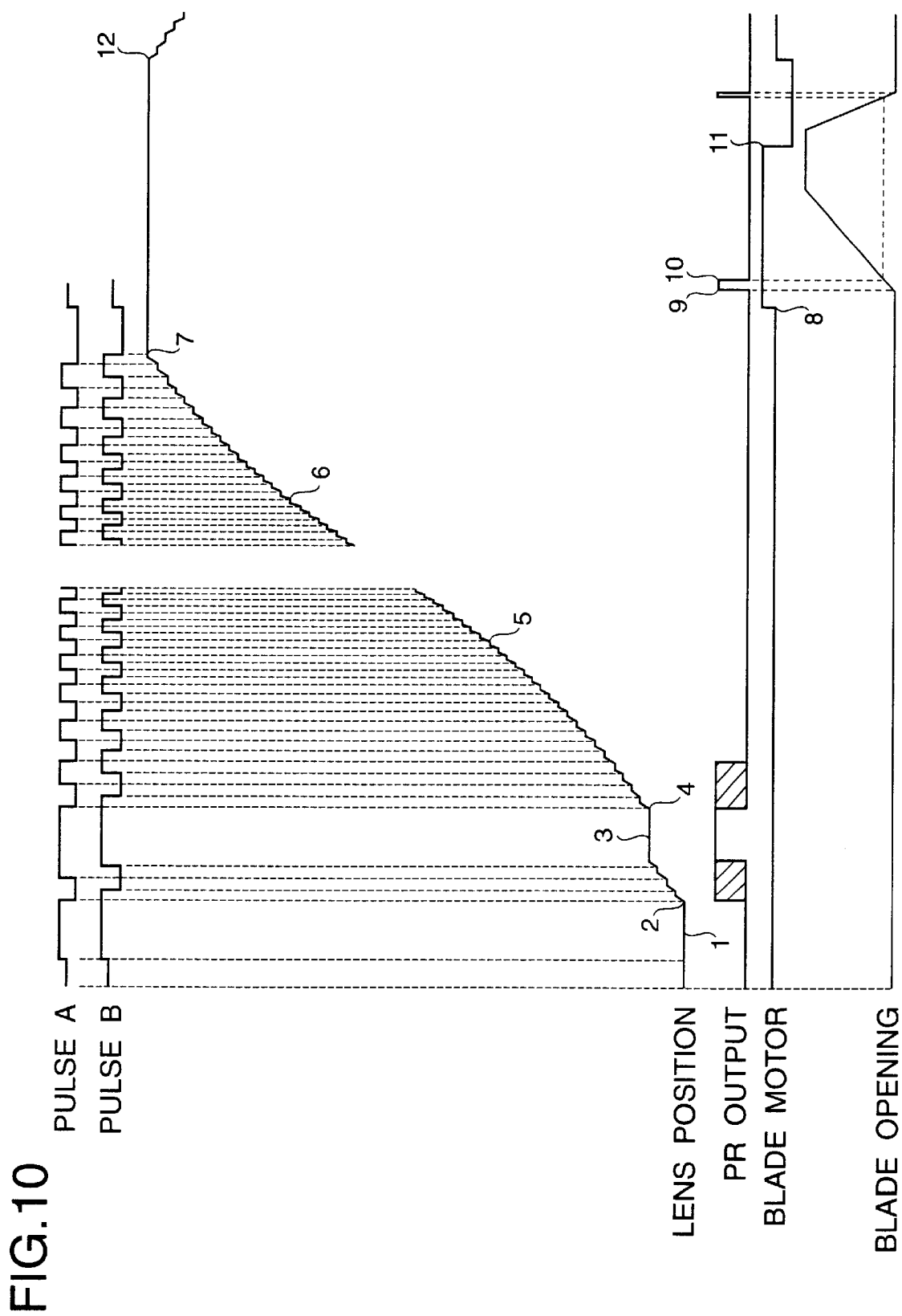

LENS DRIVE AND LENS SHUTTER UNIT

BACKGROUND OF THE INVENTION

This invention relates to a lens drive for a still camera using a stepper motor as a drive source. This invention also relates to a lens shutter unit assembled into a camera.

Hitherto, a stepper motor has been used widely as a drive source of a lens drive in a still camera. Basically, rotation of the stepper motor used as a drive source is transmitted via a power transmission train such as a gear train, thereby driving a lens. The drive amount of the lens is controlled in response to the rotation amount of the stepper motor.

The lenses for recent still cameras are designed so that the number of lens stop stages is increased in association with a tendency of multifocal systems and zoom lens systems. The previously known control system of a lens drive using a stepper motor as a drive source generally adopts a comparatively simple technique of supplying a forward pulse in a frequency band in a self-start area to the stepper motor, incrementing a preset counter having a setup value determined corresponding to the photograph subject distance, for example, based on the forward pulse, and stopping the motor when the preset counter counts up. To drive a recent camera lens with the number of lens stop stages increased in such a control system, the time required for focusing is extremely prolonged; this is a problem.

Japanese Patent Kokai Publication No. Hei. 6-258564 discloses a lens drive unit or device in which a lens is moved forwardly and backwardly in an optical axis direction while helically rotating a lens block using a mesh engagement between a female helicoid in an inner wall of a support member and a male helicoid in an outer wall of the lens block. The lens drive unit disclosed in that publication however suffers from the following problem. That is, during the helical motion of the movable side lens block relative to the fixed side support member, the lens block is moved forwardly and backwardly in a state in which an end of the lens block contacting a drive member is protruded from the support member. Accordingly, the area of the mesh engagement is varied in association with the forward and backward movement of the lens block, and a notch must be partially formed in the lens support portion (the female helicoid) to avoid the interference with the protruded end of the lens block. This makes it difficult to stably hold the lens moving backwardly.

SUMMARY OF THE INVENTION

It is therefore an object of the invention to provide a lens drive capable of shortening the time required for focusing in a recent still camera with the increased number of lens stop stages. In short, according to the invention, there is provided a lens drive comprising a stepper motor that can be rotated forwardly and reversely; motor control means for controlling driving of the stepper motor; a photographing lens for forming a subject image on a predetermined image surface; lens drive means for driving the photographing lens; and coupling means for coupling the stepper motor and the lens drive means and transmitting the forward operation of the stepper motor, thereby driving the photographing lens from an initial position to a focus position, and transmitting the reverse operation of the stepper motor, thereby driving the photographing lens from the focus position to the initial position. The motor control means comprises start control means for supplying a forward pulse in a frequency band in a self-start area to the stepper motor stopping at the initial position to start forward rotation of the stepper motor; acceleration control means for increasing a forward pulse frequency added to the stepper motor placed in the forward state by the start control means to a through area; constant-speed drive control means for maintaining the forward pulse frequency added to the stepper motor placed in the forward state in the through area by the acceleration control means to the proximity of any desired focus position; deceleration control means for again decelerating the forward pulse added to the stepper motor driven to the proximity of the focus position by the constant-speed drive control means to the frequency band in the self-start area; and stop control means for stopping the stepper motor driven to the desired focus position by the deceleration control means. Preferably, the lens drive of the invention may further include memory means storing control data for operating the start control means, the acceleration control means, the constant-speed drive control means, the deceleration control means, and the stop control means in readable form in response to the target focus position, wherein the start control means, the acceleration control means, the constant-speed drive control means, the deceleration control means, and the stop control means are operated based on the control data read from the memory means. Preferably, the lens drive of the invention may further include urging means for urging the lens drive means from the initial position to the focus position. Preferably, in the lens drive of the invention, the initial position of the photographing lens may be placed at a long-range photograph position. Further, in the lens drive of the invention, preferably the motor control means may further include reverse control means for supplying a reverse pulse in the frequency band in the self-start area to the stepper motor to move from the focus position to the initial position for returning the stepper motor to the initial position.

That is, according to the lens drive of the invention, the lens is driven in the self-start area only at the start time and stop time, but the through area occupies most of lens driving. Thus, if the number of lens stop stages is increased, the time required for focusing can be shortened sufficiently. Particularly, as claimed in claim 2, if the lens drive further includes memory means storing control data for operating the start control means, the acceleration control means, the constant-speed drive control means, the deceleration control means, and the stop control means in readable form in response to the target focus position, and the start control means, the acceleration control means, the constant-speed drive control means, the deceleration control means, and the stop control means are operated based on the control data read from the memory means, optimum control considering torque variation, etc., caused by the lens drive position can be carried out easily.

As claimed in claim 3, if the lens drive further includes urging means for urging the lens drive means from the initial position to the focus position, it is made possible to decrease the torque required for the stepper motor, it is made possible to more speed up the frequencies in the self-start area and the through area, and it is made possible to furthermore shorten the time required for focusing. For the autofocus adjustment mechanism adopting the active distance measuring system, it is known that the distance measuring accuracy is lowered as the longer range side. Generally, in the long range the distance measuring operation is executed more than once, thereby compensating for lowering of the distance measuring accuracy. Thus, there is a trend to increase the total time from distance measuring to focusing particularly on the long range side. However, as claimed in claim 4, if the initial position of the photographing lens is placed at a long-range photograph position, it is made possible to shorten the focusing time in long-range mode and it is made possible to average the total time from distance measuring to focusing regardless of the photographing distance or range.

Another object of the present invention is to provide a lens shutter unit which can move a lens forwardly and backwardly in a stable manner when a lens frame is helically moved.

A lens shutter unit according to the present invention comprises: a shutter blade which is attached to a base plate and can be opened and closed; a support frame being fixed to the base plate and extended in an optical axis direction; a lens frame for holding a lens, the lens frame being helically moved in the optical axis direction in a state in which it is housed in the support frame; a spring being placed between the lens frame and the base plate for urging the lens frame in the optical axis direction; and a lens drive ring being supported on the base plate for rotation in the surrounding of an opening made in the base plate and comprising a protruded piece for engaging the lens frame.

With this arrangement, the lens support portion (the female helicoid) can be dispensed with a notch described in the "Background of the Invention" section, and the lens frame holding the lens can be accommodated within the support frame. Consequently, the offset of the optical axis in the radial direction can be reduced remarkably, and the quality of the camera can be improved.

As claimed in claim 7, the lens shutter unit is preferably constructed such that the base plate is formed with a gear train for transmitting rotation of a rotor positioned on a side of the lens frame to a rack of the lens drive ring. In this case, the rotor for the motor is arranged on the side of the lens frame, and therefore, the unit per se can be made thin in the optical axis direction. The assembly of the unit into the camera can also be facilitated.

As claimed in claim 8, the lens shutter unit is preferably constructed such that a fix lens concentric with the optical axis of the lens is fitted in the support frame. If this construction is adopted, the lens frame is disposed so as to be accommodated within the support frame, and therefore the forward end side of the support frame can be elongated in the optical axis direction. Consequently, the fix lens can be fitted to the elongated portion. That is, a lens group made up of the movable side lens and the fixed side lens can be assembled into the unit per se.

The present disclosure relates to the subject matter contained in Japanese patent application No. Hei. 11-17465 (filed on Jan. 26, 1999), which is expressly incorporated herein by reference in its entirety.

BRIEF DESCRIPTION OF THE DRAWINGS

In the accompanying drawings:

FIG. 10 is a time chart to show a control operation example of the invention.

DESCRIPTION OF THE PREFERRED EMBODIMENT

Figure 1:
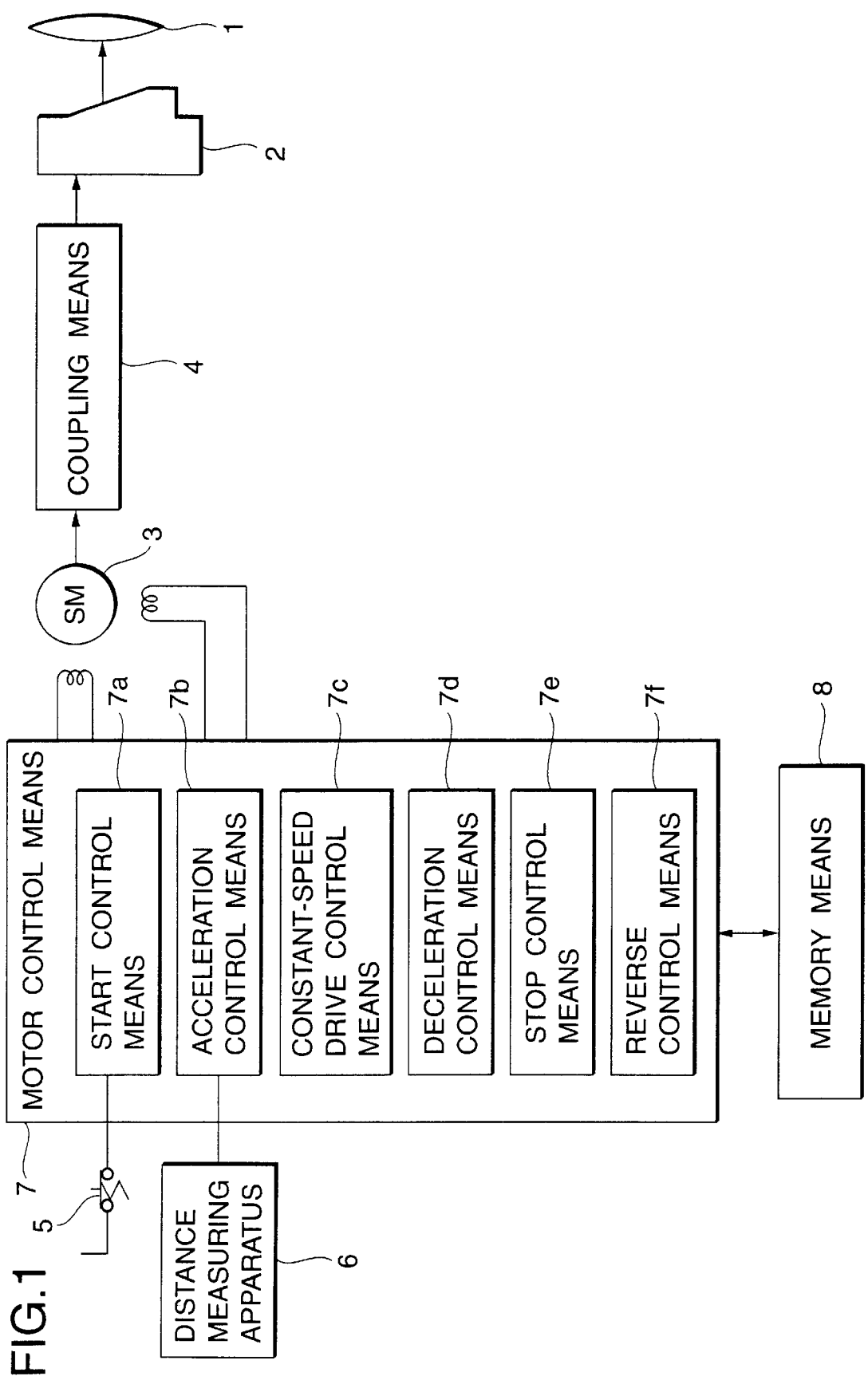
FIG. 1 is a block diagram to show the principle of a lens drive of the invention.

Referring now to the accompanying drawings, there are shown preferred embodiments of the invention. First, FIG. 1 is a block diagram to show the principle of a lens drive of the invention. In the figure, numeral 1 denotes a photographing lens for forming a subject image on a predetermined image surface, numeral 2 denotes lens drive means, such as a cam member, for driving the photographing lens 1, numeral 3 denotes a stepper motor used as a drive source, and numeral 4 denotes coupling means, such as a gear train, for transmitting rotation of the stepper motor 3 to the lens drive means 2. Numeral 5 denotes a switch for executing the distance measurement operation and the focusing operation in association with operation of a shutter button, etc., and numeral 6 denotes a distance measuring apparatus for measuring the subject distance according to active distance measurement or any other known technique.

Next, numeral 7 denotes motor control means for controlling a drive pulse supplied to the stepper motor 3 under program control and numeral 8 denotes memory means storing various pieces of control data. The motor control means 7 comprises start control means 7a for supplying a forward pulse in a frequency band in a self-start area to the stepper motor 3 stopping at an initial position and forward starting the stepper motor 3, acceleration control means 7b for increasing the forward pulse frequency added to the stepper motor 3 placed in a forward state by the start control means 7a to a through area, constant-speed drive control means 7c for maintaining the forward pulse frequency added to the stepper motor 3 placed in the forward state in the through area by the acceleration control means 7b to the proximity of any desired focus position, deceleration control means 7d for again decelerating the forward pulse added to the stepper motor 3 driven to the proximity of the focus position by the constant-speed drive control means 7c to the frequency band in the self-start area, stop control means 7e for stopping the stepper motor 3 driven to the desired focus position by the deceleration control means 7d, and reverse control means 7f for supplying a reverse pulse in the frequency band in the self-start area to the stepper motor 3 to move from the focus position to the initial position for returning the stepper motor 3 to the initial position. The control means operate in accordance with the control data provided in the memory means 8.

Figure 2:
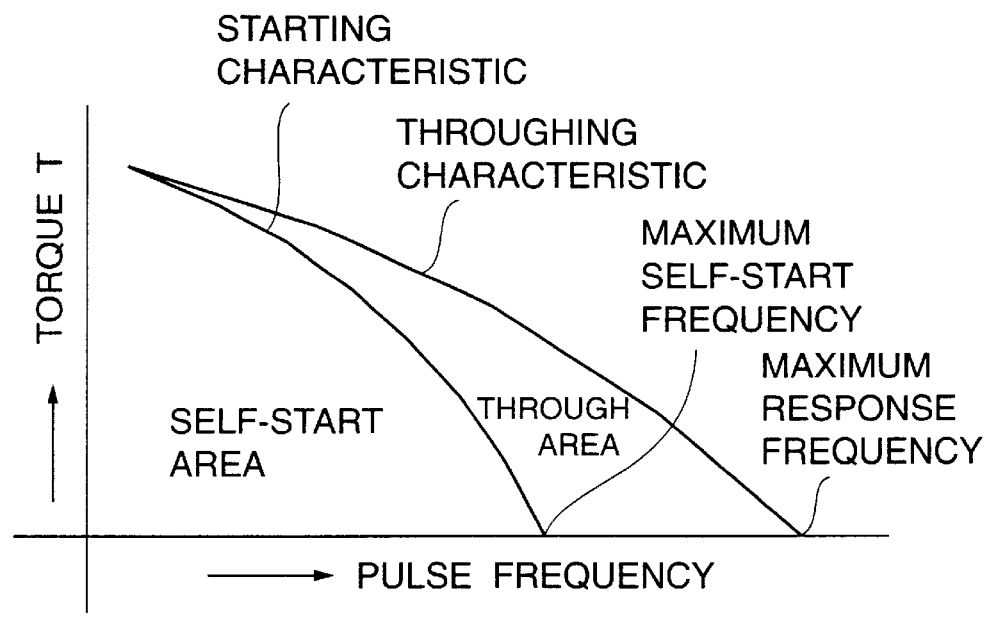
FIG. 2 is a characteristic chart to show the pulse frequency torque characteristics of a stepper motor.

FIG. 2 shows the pulse frequency torque characteristics of the stepper motor. The area below the starting characteristic curve indicates the self-start area (area in which the stepper motor can be started, stopped, or reversed in response to an input pulse) and the area above the starting characteristic curve and below the throughing characteristic curve indicates the through area (area in which a response can be made without losing synchronization if the pulse frequency is increased exceeding the self-start area or the load torque is increased). As seen in FIG. 2, the self-start area and the through area vary as the load torque varies even with the same stepper motor. To use the stepper motor as the drive source of a lens for a still camera, the load torque added to the stepper motor also varies depending on the lens delivery position. In the memory means 8, the control data pieces are provided in a one-to-one correspondence with the target focus positions and when a subject distance is input from the distance measuring apparatus 6, various control data pieces are read from the memory means 8 in response to the subject distance and the start control means 7a to the reverse control means 7f operate.

[Embodiment]

Figure 3:
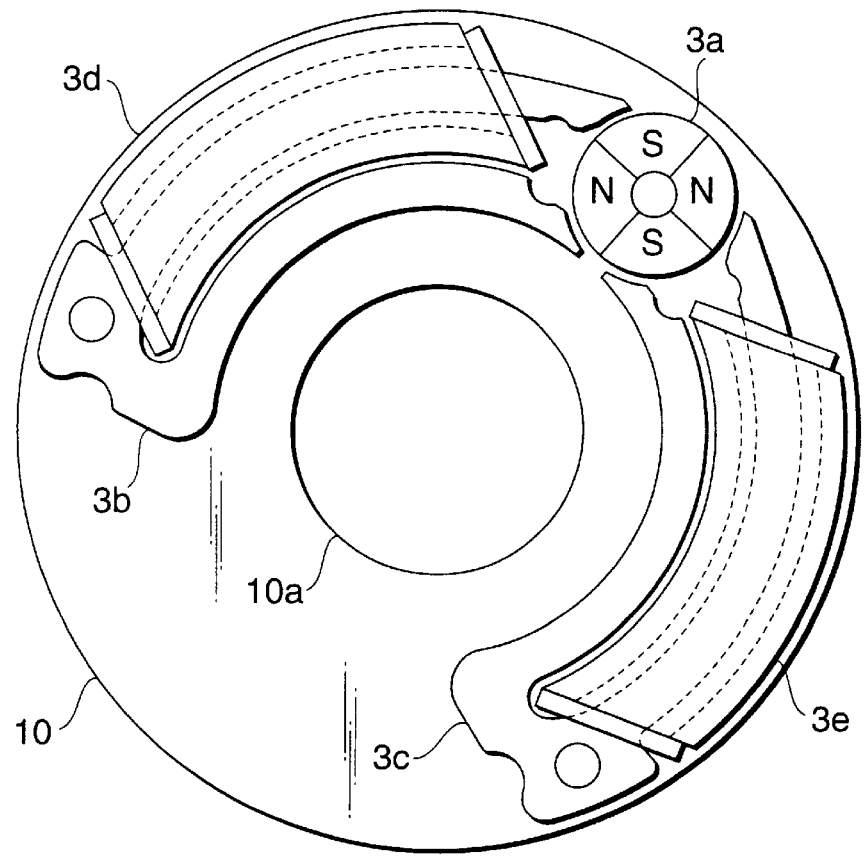
FIG. 3 is a plan view to show a configuration example of a stepper motor used with the lens drive of the invention.

Next, FIG. 3 shows a specific configuration example of the stepper motor 3. In the figure, numeral 10 denotes a base plate positioned on a side of the lens frame 31 and formed with an exposure opening 10a at the center, numeral 3a denotes a rotor with an alternating pattern of S and N poles placed at 90-degree intervals, and numerals 3b and 3c denote stators symmetrically placed with magnetic poles directed to the rotor 3a. Each stator basically is shaped like a horseshoe; to make good placement of the whole, they are formed roughly like concentric circle arc with the exposure opening 10a as the center and the magnetic pole tips are placed at the intervals of 45 degrees-90 degrees-135 degrees-90 degrees. Coils 3d and 3e are wound around the stators 3b and 3c respectively. When out-of-phase pulse signals are applied to the coils 3d and 3e, the rotor 3a is rotated step by step in the direction responsive to the phase order of the pulse signals.

Figure 4:
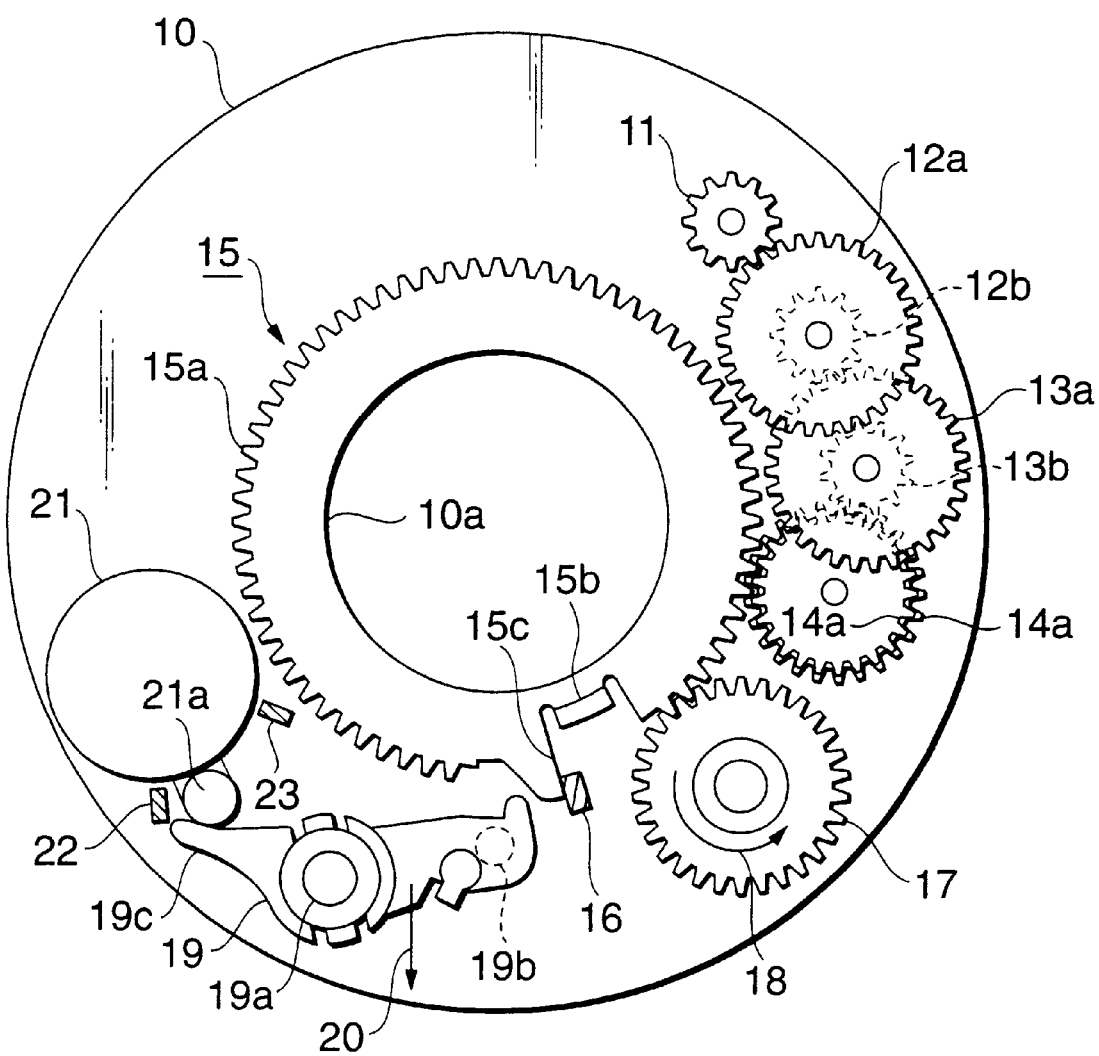
FIG. 4 is a plan view to show an example of the initial state of a power transmission path used with the lens drive of the invention.
Figure 5:
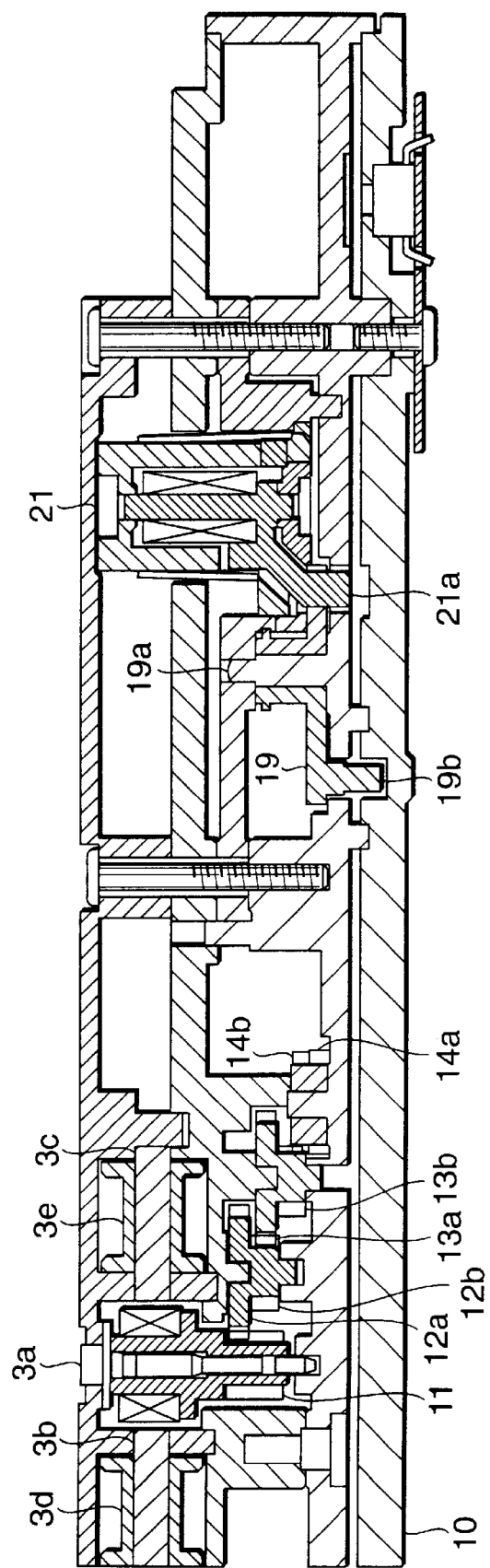
FIG. 5 is a sectional view of the power transmission path shown in FIG. 4.

Rotation of the rotor 3a is transmitted via a gear train of an example of the coupling means shown in FIGS. 4 and 5. FIG. 4 is a plan view from a photograph subject and FIG. 5 is a sectional view. First, numeral 11 denotes an output pinion coaxial with the rotor 3a. Numerals 12a and 12b, 13a and 13b, and 14a and 14b denotes large-diameter wheels and small-diameter wheels, each pair making up a two-stage gear. Rotation of the output pinion 11 is transmitted to the large-diameter wheel 12a for coaxially rotating the small-diameter wheel 12b. Rotation of the small-diameter wheel 12b is transmitted to the large-diameter wheel 13a for rotating the small-diameter wheel 13b. Rotation of the small-diameter wheel 13b is transmitted to the small-diameter wheel 14b for rotating the large-diameter wheel 14a. Numeral 15 denotes a lens drive ring of an example of the lens drive means formed with a rack 15a roughly over the full periphery. The lens drive ring 15 is supported for rotation with the exposure opening 10a as the center and the rack 15a meshes with the large-diameter wheel 14a. A lens frame (described later) is coupled with a protruded piece 15b formed on the lens drive ring 15 and is delivered from an infinity point to a proximity photograph position when the lens drive ring 15 is right turned from the state shown in FIG. 4 with the exposure opening 10a as the center. Numeral 16 denotes a stopper for initial position regulation of the lens drive ring 15. Numeral 17 denotes a delivery gear. The delivery gear 17 meshes with the rack 15a and is given left turn behavior by a spring 18. On the figure, only the urging direction is indicated by the arrow for the spring 18, but a specific structure of the spring is not limited so long as the urging force in the direction can be given. Therefore, the lens deliver gear 17 makes it possible to exert the urging force in the right turn direction on the lens drive ring 15, decrease the load torque added to the stepper motor 3 at the lens delivery time, and place the self-start area and the through area on the high-speed side. The urging force given by the spring 18 is a force to such an extent that the stepper motor is not rotated in a non-energization state.

Next, numeral 19 denotes a blade opening/closing lever for opening/closing shutter blades described later. The blade opening/closing lever 19 is supported by a shaft 19a for rotation and is given right turn behavior by a spring 20. For the spring 20, only the urging direction is also shown by the arrow. A pin 19b on the rear face of the tip of the blade opening/closing lever 19 engages the shutter blades described later and when the blade opening/closing lever 19 is turned right from the shown state, the shutter blades described later open the exposure opening 10a. Numeral 21 denotes a blade drive motor for driving the blade opening/closing lever 19 and a drive pin 21a of the blade drive motor 21 swings within a predetermined angle range as the blade drive motor 21 is energized. An arm 19c at an opposite end of the blade opening/closing lever 19 is engaged with the output pin 21a and when the output pin 21a is turned left, the blade opening/closing lever 19 is turned right by the urging force of the spring 20. Numerals 22 and 23 denote stoppers for regulating the swing range of the output pin 21a.

Figure 6:
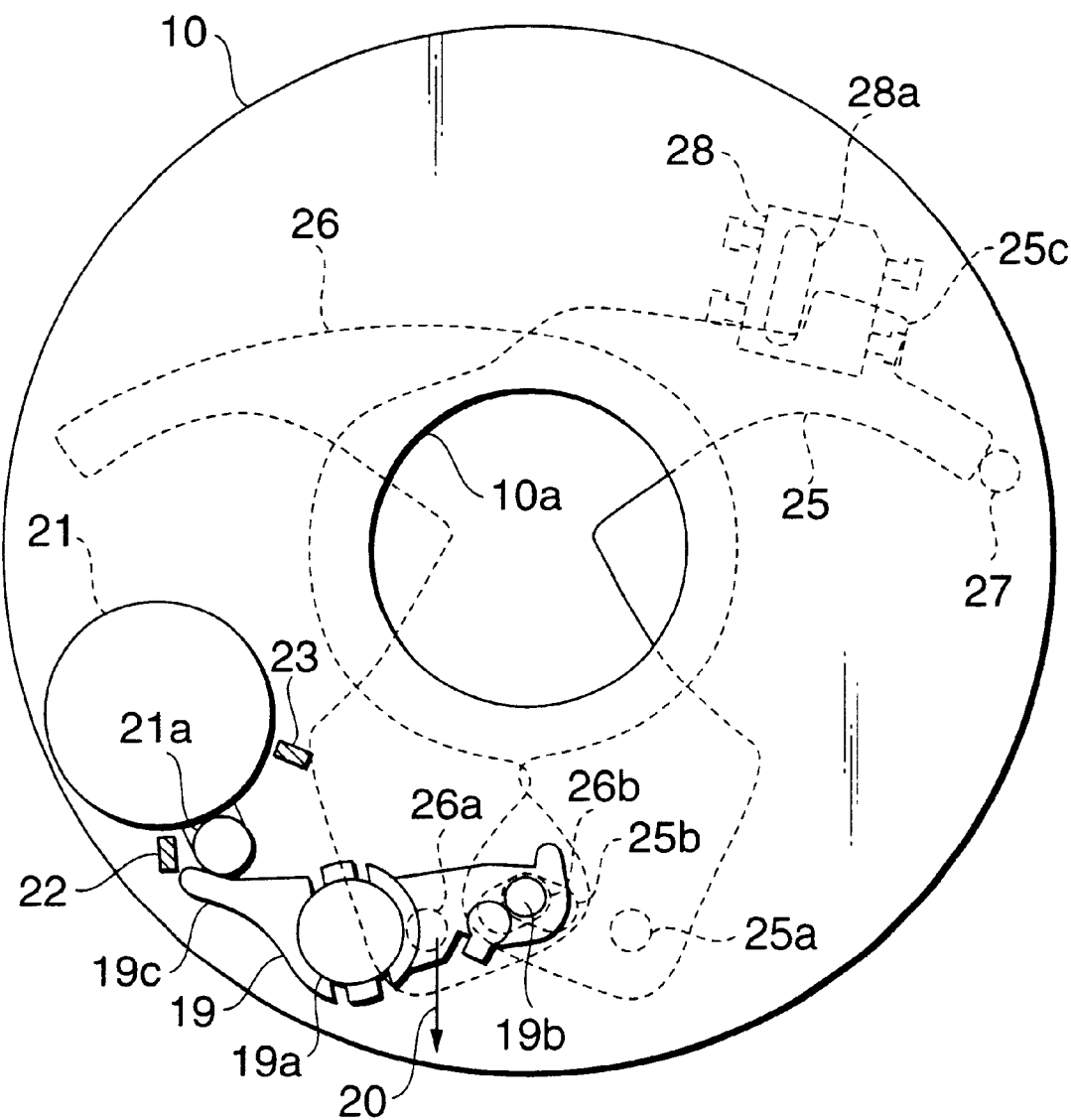
FIG. 6 is a plan view of a blade opening/closing mechanism used in the embodiment of the invention in the initial state thereof.

Next, FIG. 6 shows the configuration of the periphery of the shutter blades. Numerals 25 and 26 denote shutter blades which are basically symmetrical. The shutter blades 25 and 26 are supported on shafts 25a and 26a placed on the rear of the base plate 10 for swinging and the pin 19b placed on the rear face of the tip of the blade opening/closing lever 19 pierces the base plate 10 and engages long holes 25b and 26b made in the shutter blades 25 and 26. The through hole in the base plate 10 is not shown for simplicity. Therefore, if the blade opening/closing lever 19 is turned right from the shown state, the shutter blade 25 is turned left with the shaft 25a as the center and the shutter blade 26 is turned left with the shaft 26a as the center, opening the exposure opening 10a. Numeral 27 denotes a stopper for regulating the initial position of the shutter blade 25 and numeral 28 denotes a photo reflector for detecting the blade position.

Figure 7:
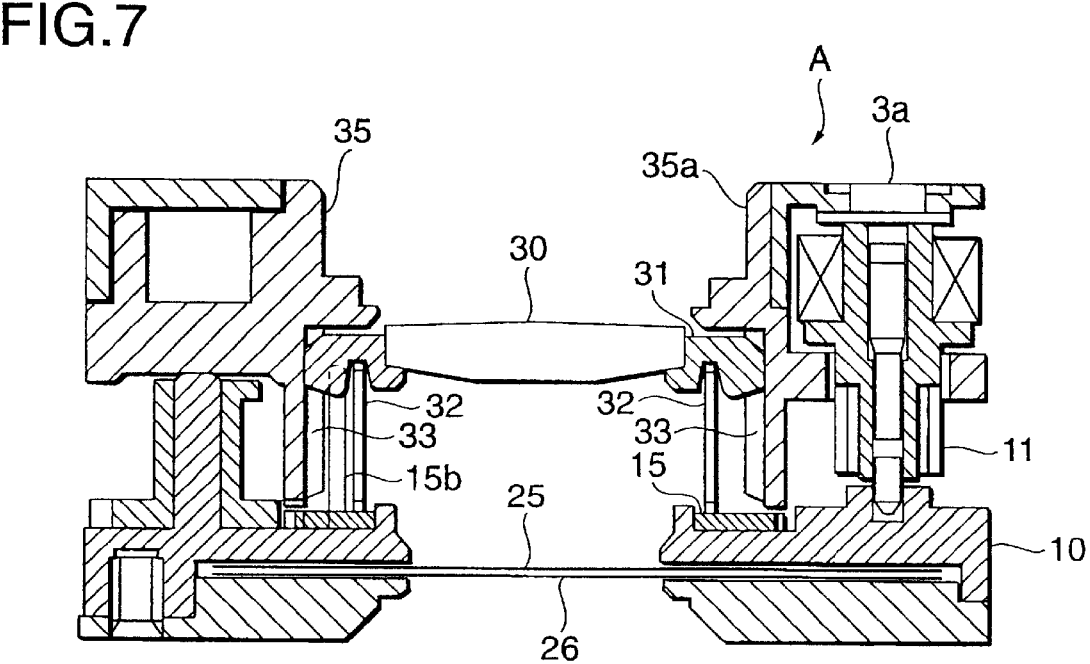
FIG. 7 is a sectional view of the lens periphery of a lens drive mechanism of the invention.

Next, FIG. 7 is a sectional view to show the relationship between the lens drive ring 15 and a lens frame 31. The lens frame 31 holding the photographing lens 30 is urged by springs 32. The protruded piece 15b bent and formed from the lens drive ring 15 supported with the exposure opening as the center on the base plate 10 engages the lens frame 31 and the outer periphery of the lens frame 31 is screwed with a helicoid screw 33. Therefore, if the lens drive ring 15 is rotated for rotating the lens frame 31, the lens frame 31 is moved in an optical axis direction along the helicoid screw 33.

As shown in FIG. 7, in a lens shutter unit A, a support frame 35 is fixed to the base plate 10. The base plate 10 and the support frame 35 cooperatively accommodate the shutter blades 25 and 26 therein. The lens frame 31 is accommodated within the support frame 35 elongated in the optical axis direction. The lens frame 31 holding the photographing lens 30 is biased by the spring 32 to eliminate the clattering thereof. This spring 32 is disposed between the lens frame 31 and the base plate 10 so as to bias or urge the lens frame 31 in the optical axis direction. The protruded piece 15b is bent-formed to stand on the lens drive ring 15 that is supported rotatably about the exposure opening 10a on the base plate 10. The protruded piece 15 is engaged with the lens frame 31, and the outer peripheral portion of the lens frame 31 is threadingly engaged with the helicoid screw 33. Accordingly, when the lens drive ring 15 is rotated to rotate the lens frame 31, the lens frame 31 is helically moved in the optical direction along the helicoid screw within the support frame 35. Since the lens frame 31 is designed to be accommodated within the support frame 35 as described above, the forward end portion 35a of the support frame 35 can be elongated in the optical axis direction as illustrated. Therefore, using this forward end portion 35a, an unillustrated fix lens can be fitted to this portion, i.e the forward end portion 35a, and thus a lens group made up of the movable side lens 30 and the fixed side lens can be assembled into the unit A per se.

Figure 8:
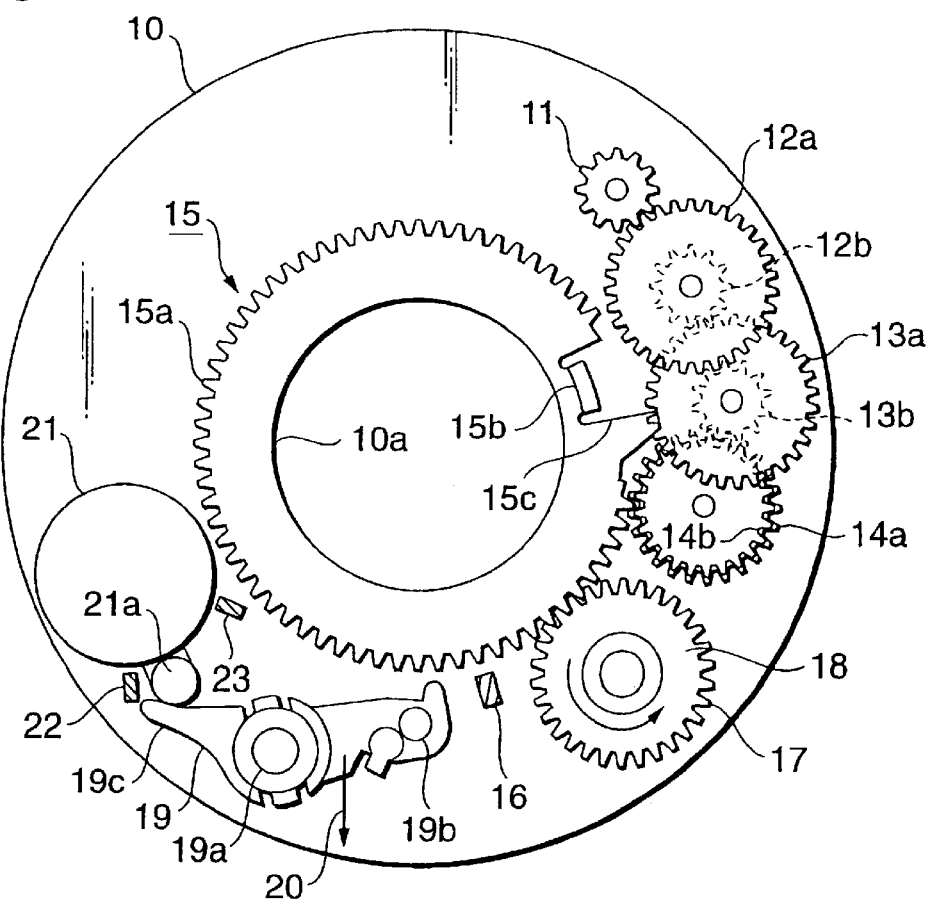
FIG. 8 is a plan view to show a state in which the power transmission path shown in FIG. 4 is operated at the maximum.
Figure 9:
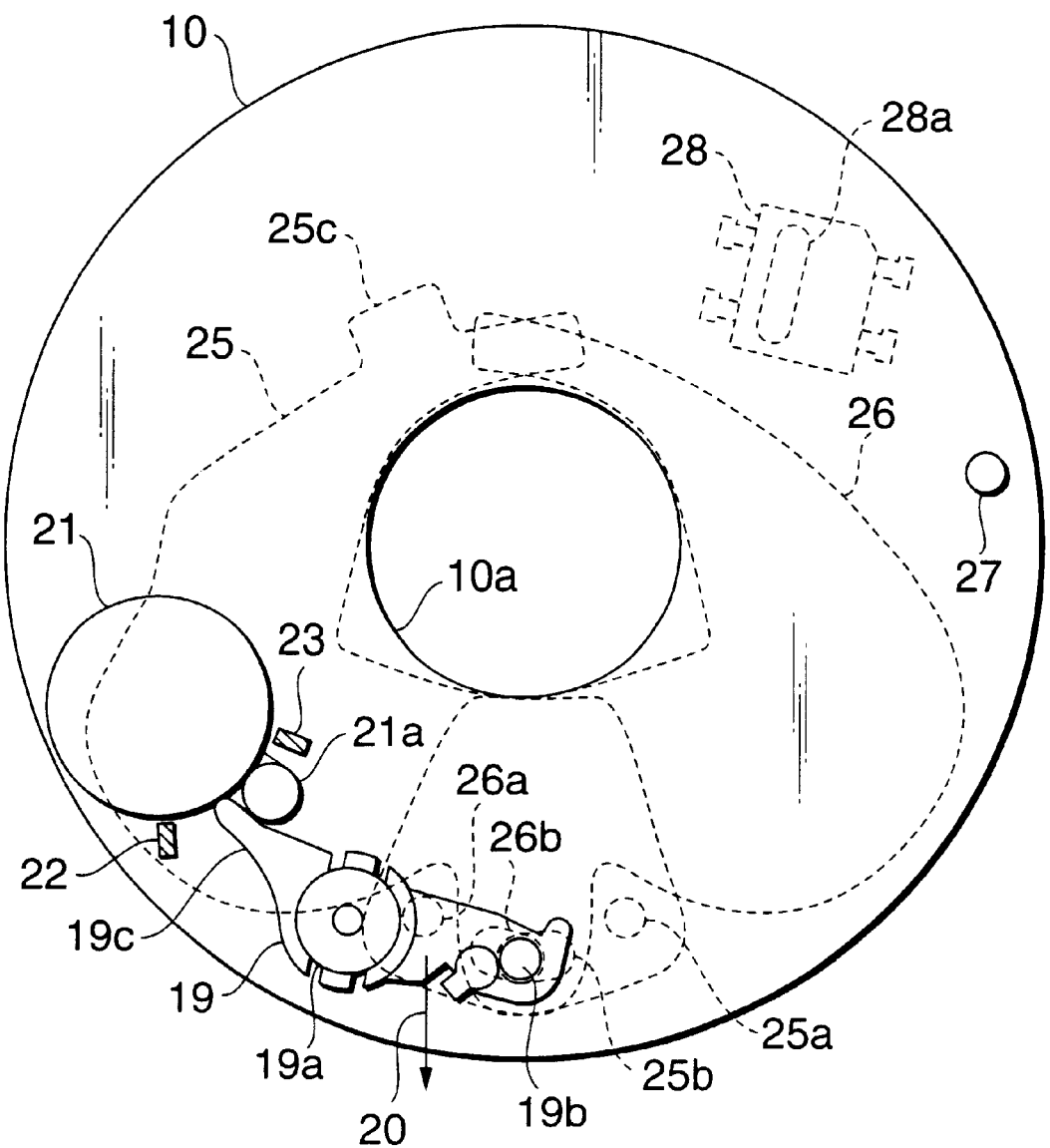
FIG. 9 is a plan view to show a state in which the blade opening/closing mechanism shown in FIG. 6 arrives at fully open position.

Next, the operation of the lens drive of the embodiment will be discussed with reference to FIGS. 8 and 9 (drawings to show state change) and FIG. 10 (time chart). When the switch 5 is turned on, the motor control means 7 reads the data indicating the distance to the photograph subject from the distance measuring apparatus 6, reads various pieces of control data from the memory means 8 based on the read distance data, and sets control data required for the start control means 7a, the acceleration control means 7b, the constant-speed drive control means 7c, the deceleration control means 7d, the stop control means 7e, and the reverse control means based on the control data 7f. In the initial state, the lens drive ring 15 is at the position shown in FIG. 4 and the start control means 7a of the motor control means 7 supplies a forward pulse (pulse with phase of pulse A leading phase of pulse B by 90 degrees) in the frequency band in the self-start area to the stepper motor 3. More particularly, both pulses A and B are held high for 10 ms (milliseconds), for example, at timing 1 in the time chart for stabilizing the stepper motor 3, then a 2.5-ms period pulse, for example, in the frequency band in the self-start area is applied to the stepper motor 3 at timing 2 in the time chart and the fourth pulse is held for 10 ms, for example.

The forward pulse is thus supplied, whereby the rotor 3a of the stepper motor 3 is rotated clockwise and the rotation is transmitted via the gears 11 to 14 shown in FIG. 4 to the rack 15a of the lens drive ring 15, right turning the lens drive ring 15 four steps. At this time, the urging force of the spring 18 is transmitted via the lens delivery gear 17 to the rack 15a of the lens drive ring 15, so that the load torque of the stepper motor 3 required for right turning the lens drive ring 15 is decreased and higher-speed self-start frequency can be set. While the lens drive ring 15 is thus turned right four steps, a protruded piece 15c of the lens drive ring 15 presses down the tip of the blade opening/closing lever 19 for slightly right turning the blade opening/closing lever 19. Consequently, the shutter blade 25 shown in FIG. 6 is slightly turned left with the shaft 25a as the center and a protruded piece 25c in the vicinity of the tip of the shutter blade 25 covers a detection window 28a of the photo reflector 28. Therefore, output of the photo reflector 28 is inverted at timing 3 in the time chart and if it is not recognized that the output is inverted, some error is assumed to occur and error handling is performed.

On the other hand, if it is recognized that output of the photo reflector 28 is inverted at timing 3 in the time chart, the motor control means 7 makes the transition to the control operation of the acceleration control means 7b from timing 4 to timing 5 in the time chart. More particularly, the acceleration control means 7b supplies a forward pulse with the pulse frequency gradually accelerated from the 2.5-ms pulse width, for example, in the self-start area to the 1.2-ms pulse width, for example, in the through area to the stepper motor 3, and the stepper motor 3 is turned right while it is gradually accelerated. Therefore, the lens drive ring 15 is also turned right while it is gradually accelerated, and the protruded part 15b of the lens drive ring 15 rotates the lens frame 31 for delivering the photographing lens 1 in a short-range direction. Also at this time, the spring 18 decreases the load torque on the stepper motor 3, thus contributing to setting of higher-speed self-start frequency and through frequency.

At timing 5 in the time chart, the stepper motor 3 is forward rotated with a forward pulse in the frequency band in the through area and the motor control means 7 makes the transition to the control operation of the constant-speed drive control means 7c from timing 5 to timing 6 in the time chart. More particularly, the constant-speed drive control means 7c continues to supply a pulse of the 1.2-ms pulse width, for example, in the through area to the stepper motor 3, thus the stepper motor 3 is rotated at constant speed and the lens drive ring 15 is also turned right at constant speed. When timing 6 in the time chart is reached, the motor control means 7 entrusts the control operation to the deceleration control means 7d to timing 7 in the time chart. More particularly, the deceleration control means 7d supplies a forward pulse with the pulse frequency gradually decelerated from the 1.2-ms pulse width, for example, in the through area to the 2.5-ms pulse width, for example, in the self-start area to the stepper motor 3, and the stepper motor 3 is turned right while it is gradually decelerated. Therefore, the lens drive ring 15 is also turned right while it is gradually decelerated for delivering the photographing lens 1 to the target focus position.

When timing 7 in the time chart is reached, the motor control means 7 entrusts the control operation to the stop control means 7e. Specifically, the stop control means 7e holds the pulse state at timing 7 for 10 ms, for example, for stabilizing the stepper motor 3, then turns off energization of the stepper motor 3 at timing 8. Therefore, the photographing lens 1 stops at the position. FIG. 8 shows the state in which the lens drive ring 15 is thus turned right at the maximum.

At the same time as energization of the stepper motor 3 is turned off at timing 8, the blade drive motor 21 is forward energized for left turning the drive pin 21a of the blade drive motor 21. Therefore, the blade opening/closing lever 19 is right turned by the urging force of the spring 20 and as shown in FIG. 9, the shutter blade 25 is left turned with the shaft 25a as the center and the shutter blade 26 is right turned with the shaft 26a as the center, opening the exposure opening 10a. When the protruded piece 25c formed on the shutter blade 25 passes through the detection window 28a of the photo reflector 28 while the shutter blade 25 thus operates, the photo reflector 28 generates a pulse. The pulse up edge at timing 9 and the pulse down edge at timing 10 can be used as delay timing for delay timing strobe synchronization for automatic exposure control, for example. At timing 11 in the time chart, if the blade drive motor 21 is reversely energized for right turning the drive pin 21a toward the initial position, the blade opening/closing lever 19 is left turned against the spring 20 and the exposure opening 10a is closed.

In the motor control means 7 at timing 12 after the exposure operation thus terminates, the reverse control means 7f operates and supplies a reverse pulse (pulse with reversed phase order of pulses A and B) in the self-start area to the stepper motor 3 and the lens drive ring 15 is reversely rotated toward the initial position and arrives at the initial position. One photographing operation is now complete. The reason why the pulse in the self-start area is used for driving at the initial return time of the lens is that a time margin exists. Acceleration and deceleration may also be executed at the reverse time. In the description given above, the motor control means comprises a plurality of control means; in tact, the control means are provided using a single microprocessor. Further, the case where the lens is delivered at the maximum has been described, but if the delivery amount is slight with long-range photographing, the pulse in the self-start area can be used for driving to the focus position without executing a sequence of acceleration, constant speed, and deceleration. If the delivery amount is small as with long-range photographing although driving in the self-start area is executed, the time required for focusing is also lessened.

As described above, according to the invention, the lens is driven in the self-start area only at the start time and stop time, but the through area occupies most of lens driving. Thus, if the number of lens stop stages is increased, the time required for focusing can be shortened sufficiently. Particularly, if the lens drive further includes memory means storing control data for operating the start control means, the acceleration control means, the constant-speed drive control means, the deceleration control means, and the stop control means in readable form in response to the target focus position, and the start control means, the acceleration control means, the constant-speed drive control means, the deceleration control means, and the stop control means are operated based on the control data read from the memory means, optimum control considering torque variation, etc., caused by the lens drive position can be carried out easily. If the lens drive further includes urging means for urging the lens drive means from the initial position to the focus position, it is made possible to decrease the torque required for the stepper motor, it is made possible to more speed up the frequencies in the self-start area and the through area, and it is made possible to furthermore shorten the time required for focusing. Further, if the initial position of the photographing lens is placed at a long-range photograph position, it is made possible to shorten the focusing time in long-range mode taking time in distance measuring operation and it is made possible to average the total time from distance measuring to focusing regardless of the photographing distance or range.

According to the present invention, a lens shutter unit is provided, which comprises: a shutter blade which is attached to a base plate and can be opened and closed; a support frame being fixed to the base plate and extended in an optical axis direction; a lens frame for holding a lens, the lens frame being helically moved in the optical axis direction in a state in which it is housed in the support frame; a spring being placed between the lens frame and the base plate for urging the lens frame in the optical axis direction; and a lens drive ring being supported on the base plate for rotation in the surrounding of an opening made in the base plate and comprising a protruded piece for engaging the lens frame. Therefore, the lens can be moved forwardly and reversely in a stable manner when the lens frame is moved helically.

What is claimed is:

1. A lens drive comprising:
    a stepper motor that can be rotated forward and reversely;
    motor control means for controlling driving of the stepper motor;
    a photographing lens for forming a subject image on predetermined image surface;
    lens drive means for driving the photographing lens;
    coupling means for coupling the stepper motor and the lens drive means, transmitting a forward operation of the stepper motor, thereby driving the photographing lens from an initial position to a focus position, and transmitting a reverse operation of the stepper motor, thereby driving the photographing lens from the focus position to the initial position; and
    memory means connected to said motor control means for storing control data therein so that the control data can be readable depending on an object focus position, said control data comprising individual data for each one of a plurality of object focus positions, wherein the motor control means comprises:
        start control means for supplying a forward pulse in a frequency band of a self-start area to the stepper motor stopping at the initial position to start forward rotation of the stepper motor;
        acceleration control means for increasing frequency of the forward pulse so that the forward pulse in a frequency band of a through area is supplied to the stepper motor which is placed in a forward rotation state by the start control means;
        constant-speed drive control means for maintaining the frequency of the forward pulse supplied to the stepper motor, which is placed in the forward rotation state in the through area by the acceleration control means, until the stepper motor, is driven to a proximity of the object focus position;
        deceleration control means for decreasing the frequency of the forward pulse so that the forward pulse in the frequency band of the self-start area is supplied to the stepper motor which is driven to the proximity of the object focus position by the constant-speed drive control means; and
        stop control means for stopping the stepper motor using the deceleration control means when the stepper motor is driven to the object focus position.

2. The lens drive as claimed in claim 1, wherein the start control means, the acceleration control means, the constant-speed drive control means, the deceleration control means, and the stop control means are operated based on the control data read from the memory means.

3. The lens drive as claimed in claim 1, further comprising:
    urging means for urging the lens drive means in a direction from the initial position to the focus position.

4. The lens drive as claimed in claim 1, wherein the initial position of the photographing lens is placed at a long-range photograph position.

5. The lens drive as claimed in claim 1, wherein the motor control means further includes reverse control means for supplying a reverse pulse in the frequency band of the self-start area to the stepper motor moving from the focus position to the initial position to return the stepper motor to the initial position.

6. The lens drive as claimed in claim 1, further comprising:
    distance measuring means connected to said motor control means for measuring a distance to a subject.

7. The lens drive as claimed in claim 1, wherein a plurality of individual data are read from said memory means when a subject distance is input to said motor control means.

8. The lens drive as claimed in claim 1, wherein said lens drive means drives said photographing lens in the self-start area only at a start time and a stop time.

9. The lens drive as claimed in claim 8, wherein said self-start area comprises an area in which the stepper motor can be started, stopped, or reversed in response to an input pulse.

10. The lens drive as claimed in claim 1, wherein said control data are provided in a one-to-one correspondence with a plurality of object focus positions and, when a subject distance is input from said distance measuring apparatus, selective ones of said control data are read from said memory means and said start control means is operated.

11. The lens drive as claimed in claim 1, wherein the start controller, the acceleration controller, the constant-speed drive controller, the deceleration controller, and the stop controller are operated based on the control data read from the memory.

12. The lens drive as claimed in claim 1, further comprising:
an urging mechanism for urging the lens driver in a direction from the initial position to the focus position.

13. The lens drive as claimed in claim 1, wherein the initial position of the photographing lens is placed at a long-range photograph position.

14. The lens drive as claimed in claim 1, wherein the motor controller further includes a reverse controller for supplying a reverse pulse in the frequency band of the self-start area to the stepper motor moving from the focus position to the initial position to return the stepper motor to the initial position.

15. A lens drive comprising:
a stepper motor that can be rotated forward and reversely;
a motor controller connected to said stepper motor for controlling driving of the stepper motor;
a photographing lens for forming a subject image on predetermined image surface;
a lens driver for driving the photographing lens;
a coupler for coupling the stepper motor and the lens driver, transmitting a forward operation of the stepper motor, thereby driving the photographing lens from an initial position to a focus position, and transmitting a reverse operation of the stepper motor, thereby driving the photographing lens from the focus position to the initial position; and
a memory connected to said motor controller for storing control data therein so that the control data can be readable depending on an object focus position, said control data comprising individual data for each one of a plurality of object focus positions,
wherein the motor controller comprises:
a start controller for supplying a forward pulse in a frequency band of a self-start area to the stepper motor stopping at the initial position to start forward rotation of the stepper motor;
an acceleration controller for increasing frequency of the forward pulse so that the forward pulse in a frequency band of a through area is supplied to the stepper motor which is placed in a forward rotation state by the start controller;
a constant-speed drive controller for maintaining the frequency of the forward pulse supplied to the stepper motor, which is placed in the forward rotation state in the through area by the acceleration controller, until the stepper motor, is driven to a proximity of a desired focus position;
a deceleration controller for decreasing the frequency of the forward pulse so that the forward pulse in the frequency band of the self-start area is supplied to the stepper motor which is driven to the proximity of the focus position by the constant-speed drive controller; and
a stop controller for stopping the stepper motor using the deceleration controller when the stepper motor is driven to the desired focus position.

16. A lens drive comprising:
a motor that can be rotated forwardly and reversely;
a controller connected to said motor for controlling driving of the motor;
a lens for forming a subject image on a predetermined image surface;
a lens driver for driving the lens;
a coupler for coupling the motor and the lens driver; and
a memory connected to said controller for storing control data therein so that the control data can be readable depending on an object focus position,
wherein said control data comprises individual data for each one of a plurality of object focus positions and when one of said plurality of object focus positions is input said corresponding individual data stored in said memory is read by said controller to drive said motor.

17. The lens drive as claimed in claim 16, wherein said controller includes:
a start controller for supplying a forward pulse in a frequency band of a self-start area to the motor stopping at the initial position to start forward rotation of the motor;
an acceleration controller for increasing frequency of the forward pulse so that the forward pulse in a frequency band of a through area is supplied to the motor which is placed in a forward rotation state by the start controller;
a constant-speed drive controller for maintaining the frequency of the forward pulse supplied to the motor, which is placed in the forward rotation state in the through area by the acceleration controller, until the motor, is driven to a proximity of a desired focus position;
a deceleration controller for decreasing the frequency of the forward pulse so that the forward pulse in the frequency band of the self-start area is supplied to the motor which is driven to the proximity of the focus position by the constant-speed drive controller; and
a stop controller for stopping the motor using the deceleration controller when the motor is driven to the desired focus position.

* * * * *